US008321448B2

(12) United States Patent
Zeng et al.

(10) Patent No.: US 8,321,448 B2
(45) Date of Patent: Nov. 27, 2012

(54) CLICK-THROUGH LOG MINING

(75) Inventors: HuaJun Zeng, Beijing (CN); Jian Hu, Beijing (CN); Hua Li, Beijing (CN); Zeng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 11/870,359

(22) Filed: Oct. 10, 2007

(65) Prior Publication Data

US 2008/0208841 A1   Aug. 28, 2008

Related U.S. Application Data

(60) Provisional application No. 60/891,182, filed on Feb. 22, 2007.

(51) Int. Cl.
G06F 17/30 (2006.01)
G06F 17/00 (2006.01)

(52) U.S. Cl. .......................................... 707/767; 707/765

(58) Field of Classification Search ........................ None
See application file for complete search history.

(56) References Cited

U.S. PATENT DOCUMENTS

| | | | |
|---|---|---|---|
| 7,181,438 B1 * | 2/2007 | Szabo | 1/1 |
| 7,401,074 B2 * | 7/2008 | Liu et al. | 707/767 |
| 7,647,314 B2 * | 1/2010 | Sun et al. | 707/742 |
| 2005/0015366 A1 * | 1/2005 | Carrasco et al. | 707/3 |
| 2005/0021397 A1 * | 1/2005 | Cui et al. | 705/14 |
| 2005/0137939 A1 * | 6/2005 | Calabria et al. | 705/26 |
| 2006/0206516 A1 * | 9/2006 | Mason | 707/102 |
| 2006/0248068 A1 * | 11/2006 | Chien et al. | 707/4 |
| 2007/0061211 A1 * | 3/2007 | Ramer et al. | 705/25 |
| 2008/0183685 A1 * | 7/2008 | He et al. | 707/4 |

OTHER PUBLICATIONS

Doug Beeferman, Adam Berger,"Agglomerative clustering of a search engine query log", ACM 2000.*
Qiankun Zhao, Steven C. H. Hoi, Tie-Yan Liu, Sourav S. Bhowmick, Michael R. Lyu, Wei-Ying Ma"Time-Dependent Semantic Similarity Measure of Queries Using Historical Click-Through Data", World Wide Web Conference Committee, WWW 2006.*

* cited by examiner

*Primary Examiner* — Neveen Abel Jalil
*Assistant Examiner* — Polina Peach
(74) *Attorney, Agent, or Firm* — Lee & Hayes, PLLC

(57) ABSTRACT

Click-through log mining is described. Raw search click-through log data is processed to generate ordered query keywords, utilizing an algorithm to expand user-submitted keywords to include high frequency user queries, managing the keywords for a keyword expansion file, analyzing the algorithm performance on a bidding criteria, and identifying related phrases with similar page-click behaviors for advertisements.

17 Claims, 4 Drawing Sheets

CLICK-THROUGH LOG MINING

RELATED APPLICATION

The present application claims priority to U.S. Provisional Patent Application Ser. No. 60/891,182, entitled, "Click-through log mining for ads broad match", to Zeng et al., filed on Feb. 22, 2007, which is incorporated by reference herein.

TECHNICAL FIELD

The subject matter relates generally to internet-based advertising, and more specifically, to click-through log mining by using a keyword suggestion algorithm.

BACKGROUND

Companies spend a large portion of operating expenses each year on advertisements. In traditional advertising environments (e.g., newspaper, magazines, television), the price of an advertisement is typically based on visibility. For example, an advertiser pays more for an ad placed on the front page of a newspaper than the ad placed on the third page of the second section of the newspaper. With these traditional methods of advertising, a cost of the advertisement is known up-front, and the expected return on investment is based on the degree of visibility that the advertisement receives.

With people changing to a computer-based society, companies are turning towards internet-based advertising. Here, the advertisers typically bid auction-style for placement of ads or for keywords within a web page, with the bid price indicating the amount that the advertiser offers to pay the auctioneer, either per impression or per click-through. Click-through rate (CTR) measures a success of internet-based advertising, by dividing a number of users who clicked on an ad on a web page by the number of times the ad was delivered (impressions).

Advertisers pay when a user actually clicks on an ad to visit the advertiser's website, commonly known as pay per click (PPC). The paid search auctions return relevant paid advertisements in response to queries from users. In order to return relevant content, advertisers bid on keywords that their target market would type in the search bar when looking for a service or a product. For example, an advertiser purchases the keyword, "pink flowers". In this example, a user types in the phrase "pink flowers" in the search bar. The phrase matches the advertiser's keyword list or displays an advertisement with relevant content for the purchased keyword of "pink flowers". Thus, advertisers may bid for spots in conjunction with a particular keyword that a user may enter for a search.

Along with their bids, advertisers also typically submit a budget amount. After the budget is reached (based on the price paid per received click-through of the ad), the advertisement is no longer displayed. Over time, advertisers have determined ways of increasing revenue by submitting lower bids, which lowers the revenue for the auctioneer (e.g., a search engine) providing the advertising slots or keyword suggestions.

A problem with purchasing keywords is that there is tremendous variation in search phrases typed by users. Rather than thinking of a single monotonic phrase like "pink flowers", there will often be a variety of phrases that may mean the same thing. Thus, the advertisers would convert to this variety of phrases, if the searchers were presented with the advertisement. Also, it is difficult to identify a wide variety of phrases and to suggest related phrases. Thus, keyword suggestion searching has not been widely utilized by advertisers in internet-based advertising.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods, computer program products, and systems for utilizing click-through log mining and providing keyword suggestion for searches. This disclosure describes a keyword phrase which may include, but is not limited to, for example, a single keyword or a combination of keywords and any related phrases that have similar page-click behaviors, according to a click-through log. If an advertiser bids on a single keyword, the related phrases with similar page-click behaviors will be suggested. Thus, the features in this disclosure provide a benefit to advertisers by suggesting related phrases, which have similar page-click behaviors.

In an exemplary implementation, a click-through log is utilized to generate ordered query keywords, by expanding user-submitted keywords to include similar high frequency user queries. Furthermore, keywords for a keyword expansion list and/or file are managed, and performance of an algorithm is analyzed based on a click-through rate criterion or a revenue-per-search criteria. For example, the algorithm may be a Keyword ExpanSion (KES) algorithm.

An exemplary system described includes a processor, a memory, and instructions to process raw search data, construct a bipartite graph, manage a keyword expansion file, and evaluate a click-through rate.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary methods, computer program products, and systems for utilizing click-through log mining and keyword suggestion searches. As described herein, a keyword phrase may include, but is not limited to, for example, a single keyword or a combination of keywords and any related phrases that have similar page-click behaviors in a click-through log. The features in this disclosure provide a benefit to advertisers by suggesting related phrases, which have similar page-click behaviors.

In one aspect, a process utilizes a click-through log to generate ordered query keywords, which further expands keywords submitted by a user to include high frequency keywords. Furthermore, keywords for a keyword expansion file are managed and performance of an algorithm for expanding the user-submitted keywords is analyzed based on a click-through rate criteria and/or a revenue per search criteria.

In another aspect, an algorithm, known as a keyword expansion suggestion (KES) algorithm, improves ad center matching, increases ad coverage, and increases bid density and revenue without significantly decreasing a click-through rate. Thus, the keyword expansion suggestion algorithm is optimized to expand online user search queries to an ad center bidding keywords while keeping the content and/or concept relevance through mining search click-through log data.

In another aspect, a system includes a processor, a memory, and instructions to process raw search data, construct a bipartite graph, manage a keyword expansion file, and evaluate a click-through rate.

The described click-through log mining and keyword suggestion methods improve the searching efficiency and convenience for the user. Furthermore, the described click-through log mining and keyword suggestion methods described expand the results of online search queries and keep the content relevant through mining search click-through log data for the advertisers. By way of example and not limitation, the click-through log mining and keyword suggestion methods described herein may be applied to many contexts and environments. By way of example and not limitation, the click-through log mining and keyword suggestion methods may be implemented to support advertising used on search engines, advertising networks, content websites, content blogs, and the like.

Illustrative Environment

Figure 1:
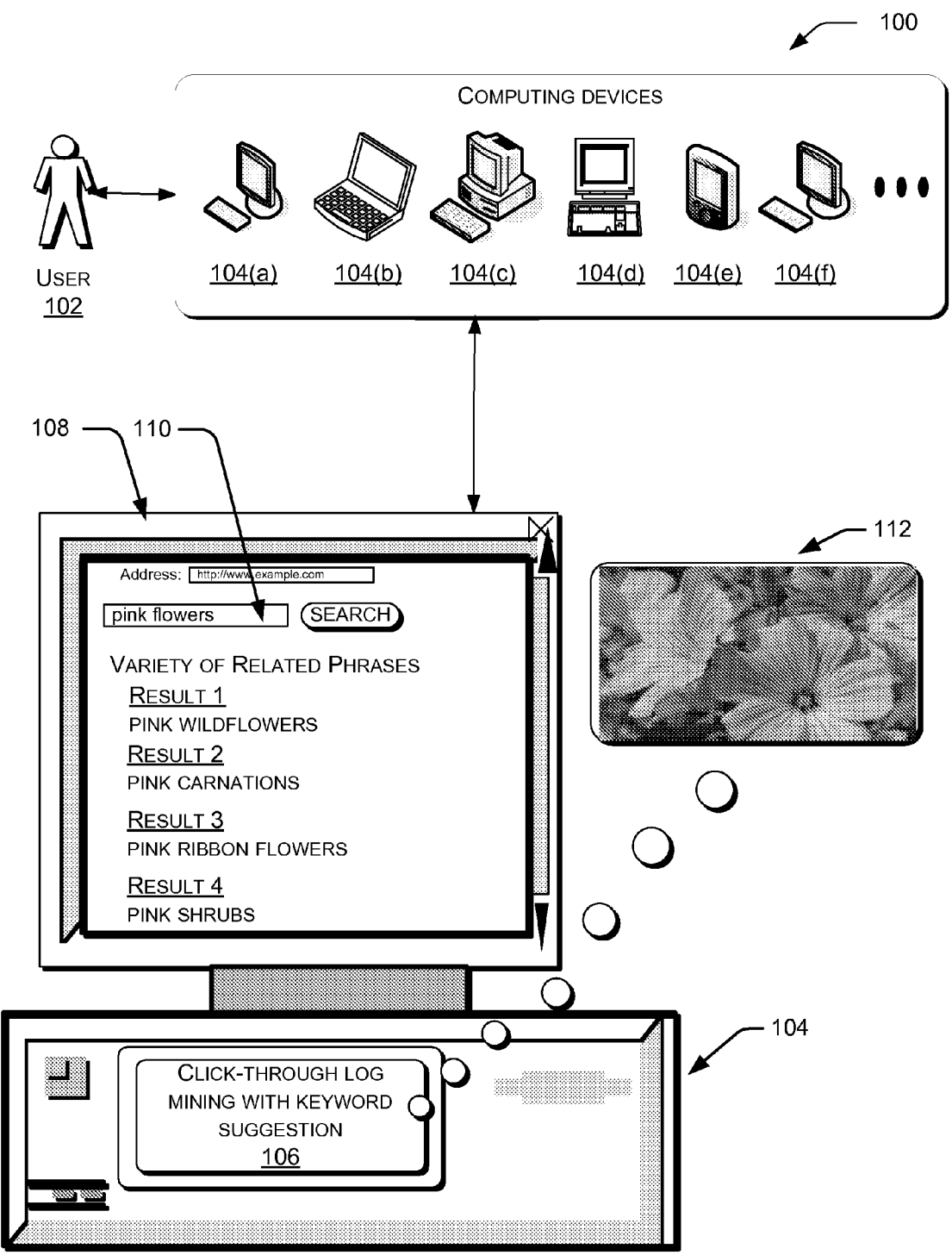
FIG. 1 is a block diagram of an exemplary search environment that utilizes click-through log mining with keyword suggestion.

FIG. 1 is an overview block diagram of an exemplary environment 100 for providing click-through log mining with keyword suggestion method. A user 102 shown with computing device(s) 104 is enable to enter keywords and initiate a search. The term "user" 102, and "consumer" may be used interchangeably to describe a person or an entity using a communication device. The environment 100 may provide click-through log mining with keyword suggestions as, for example, but not limited to, a tool, a method, a solver, software, an application program, a service, technology resources which include access to the internet, and the like.

Computing devices 104 that are suitable for use with the environment 100, include, but are not limited to, a personal computer 104(a), a laptop computer 104(b), a desktop computer 104(c), a workstation computer 104(d), a personal digital assistance 104(e), a cellular phone 104(f), and the like. These various types of computing devices 104 in operation with click-through log mining with keyword suggestion enables the user 102 to click-through log mining for ads.

FIG. 1 illustrates an exemplary application program, referred to as a keyword expansion suggestion 106 provides related phrases in response to a user-entered search phrase. Here, the application program 106 includes an algorithm for expanding online user search keywords to bidding keywords while keeping the content relevant through mining search click-through log data. In particular, the algorithm helps identify a top number (N) of related keywords with a relevance score for suggestions to input keywords.

A display monitor 108 illustrates implementation of the exemplary application program 106. In this exemplary application program 106, a similarity of queries and a similarity of web pages are mutually reinforcing notions; web pages are considered similar kinds, if the web pages are visited by similar type queries. Queries are grouped as similar types, if the queries visit similar web pages.

The exemplary keyword expansion suggestion application program 106 shows phrases that are related to the user-submitted keyword, "pink flowers" 110. For example, if an advertiser bids on "pink flowers" as the single keyword, then a variety of related phrases 110 which have similar page-click behaviors in the click-through will be suggested by the program 106. In an exemplary implementation, keyword suggestions may include "pink wildflowers", "pink carnations", "pink ribbon flowers", and "pink shrubs", which may be related phrases with similar page-click behaviors. Similar page-click behavior occurs when different users or a single user will enter separate queries, such as "pink wildflowers" and "pink carnations" into web search engines or the like. Upon satisfying the queries based on the user(s), the web address returning keywords may be the uniform resource locator (URL), www.pinkflowers.com, for both of these search terms. Thus, "pink wildflowers" and "pink carnations" have similar page-click behaviors. As a result of the search, the pink flowers shown 112, may be displayed. Thus, the click-through log mining with KES application program 106 provides suggestions of related phrases to return relevant results.

Illustrative Process

Figure 2:
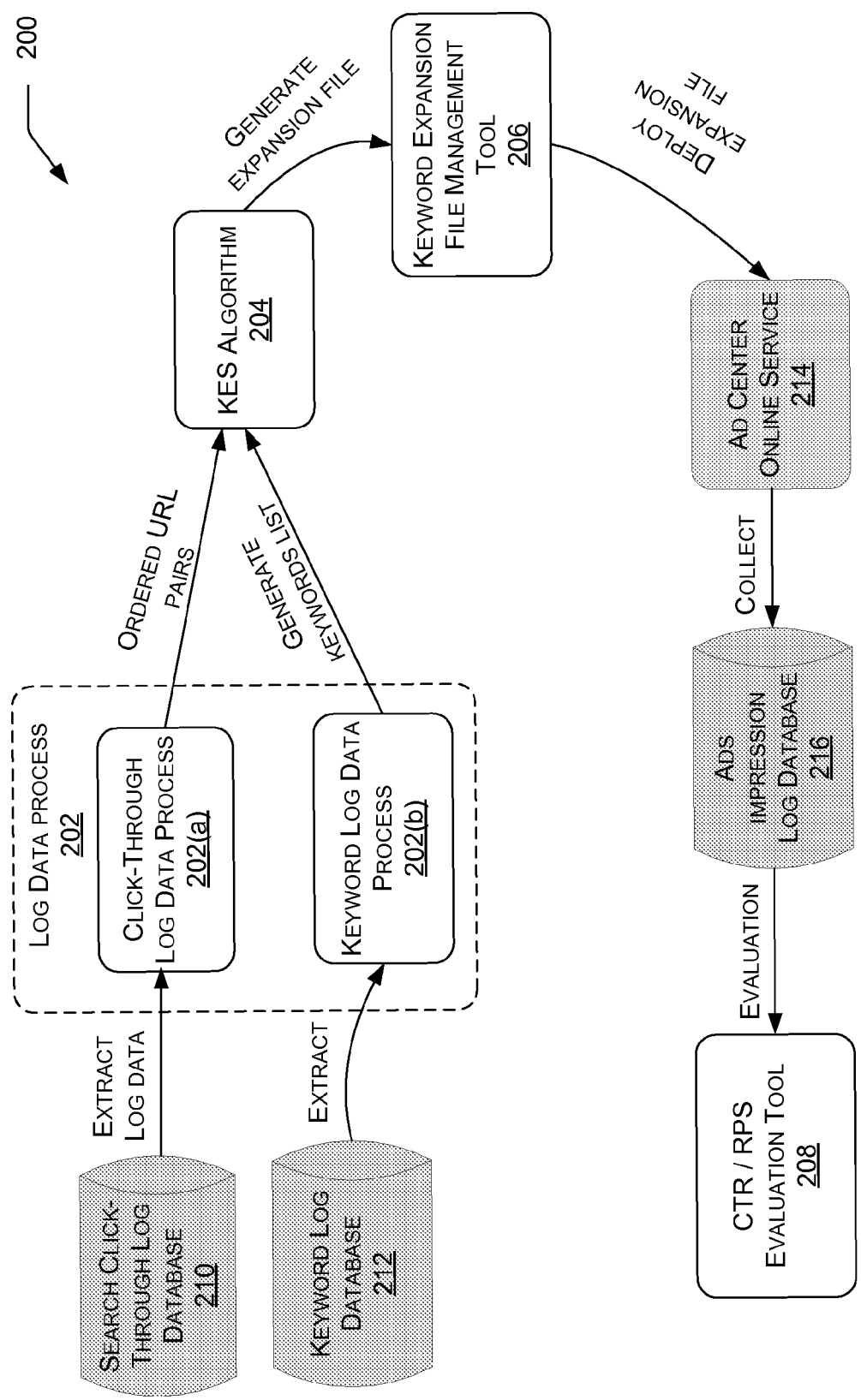
FIG. 2 is an overview flowchart showing an exemplary process for click-through log mining with keyword suggestion searches.

Illustrated in FIG. 2 is an overview exemplary flowchart of a process 200 for implementing the click-through log mining with keyword suggestion method to provide a benefit to advertisers by suggesting related phrases, which have similar page-click behaviors. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an example of the click-through log mining with the keyword suggestion 106 of FIG. 1. The process 200 includes a log data process 202, a Keyword ExpanSion (KES) algorithm 204, a keyword expansion file management tool 206, and a click-through rate (CTR) and/or revenue per search (RPS) evaluation tool 208. The keyword expansion (KES) algorithm is implemented to capture a wide variety of phrasings, so that any related phrases, which have similar page-click behaviors in the click-through log will be suggested.

Starting at block 202 is the log data process which includes a click-through log data process 202(a) and a keyword log data process 202(b). The log data process 202(a) receives information from a search click-through log database 210 to extract log data, as shown on the left side of block 202(a). Click-through log data is a log file to record a search user's click behavior when the user makes a search on a search engine and clicks a search result. This data is captured at a server side of a search service, for example, a MSN search engine. The click-through log data process 202(a) extracts the log data and analyzes the log data before proceeding to the KES algorithm 204. The process 202(a) illustrates processing raw search click-through log data to generate ordered query-uniform resource locator (URL) pairs.

Block 202(b) is the keyword log data process, which occurs at or about the same time as block 202(a). Here, the process 202(b) extracts keywords from a keyword log database 212, shown on the left side of block 202(b). The keyword log data process 202(b) generates a keywords list, shown on the right side of block 202(b), before proceeding to the KES algorithm 204. The term "list" is used to indicate a list of keywords expansions. The keyword log data process 202(b) illustrates extracting keywords to generate the keywords list.

KES algorithm 204 receives query-URL pairs from block 202(a), and constructs a bipartite graph with one set of vertices corresponding to queries, and a second set of vertices corresponding to web pages. Here, a similarity of queries and a similarity of web pages are mutually reinforcing notions; web pages are considered similar kinds, if the web pages are visited by similar type queries. Queries are grouped as similar types, if the queries visit similar web pages. Therefore, an iterative reinforcement as part of the KES algorithm 204, computes the similarity between the web pages and the queries, which fully explores the relationships between the web pages and the queries. This procedure executes iteratively until the KES algorithm 204 reaches a fixed point. The fixed point is considered to be a fixed and/or predefined iteration number.

KES algorithm 204 also receives the keywords list from block 202(b), and identifies the top number (N) most similar keywords. In an exemplary implementation, N is a user-defined parameter. The KES algorithm 204 determines the number of similar keywords (N) from the similarity between each query. This occurs by looking up the ad keywords generated from the keyword log process 202(b) in the queries within the click-through log data process 202. Here, the KES algorithm 204 expands the list of suggested keywords to include bidding keywords or high frequency user queries, according to the query-URL correlations.

Keyword expansion file management tool 206 receives a newly generated keywords expansion file from the KES algorithm 204. Here, "file" means a file containing the keywords/expansions list that is generated from above. In an exemplary implementation, keyword expansion file management tool 206 appends this newly generated keywords expansion file with a previously deployed keywords expansion file. In an alternate implementation, keyword expansion file management tool 206 replaces a previous keywords expansion file with the newly generated keywords expansion file. By appending the keyword expansion file, a much larger file with more information is created. On the other hand, by replacing the previous keywords expansion file, older data is no longer included in the keywords expansion file. In an exemplary implementation, the management tool 206 enables management of the keyword expansion file with a rich user interface.

After block 206, the process 200 deploys the expansion file to an ad center online service 214, where the process collects information for an ads impression log database 216. From here, the process moves toward evaluation.

Click-through rate (CTR)/revenue per search (RPS) evaluation tool 208 automatically evaluate the keywords expansion file. In an exemplary implementation, the keywords expansion file is evaluated based on CTR and/or RPS criteria data.

In an exemplary implementation, the user 102 may set up time intervals to choose the proper raw log data to generate the ordered query-URL pairs. The time intervals for fetching click-through log data are designed to be configurable. For example, four options include the latest day, the latest week, the latest month, and user specified time interval. In particular, the user specified time interval may include MM/DD/YY-MM/DD/YY.

Next, the process retrieves the raw log data, such as a click-through log data path designed to set up according to a real application scenario. Furthermore, the process sorts the query-URL pairs according to a query alphabet and filters noisy query-URL pairs, and stores the query-URL mapping files into a specified path. Here, the noisy query-URL pairs are usually URLs with very few queries that are associated or some queries with very few URLs that are associated. Thus, these queries, known as noisy query-URL pairs are removed as part of the filtering process. The mapping files describe a "click" relationship between a query and a URL. For example, a search user makes a "query" and later clicks on the "URL" from the results. Thus, this pair of "query" and "URL" is generated into the mapping files. Furthermore, a folder and/or a disk path setup may be created by the users to store the mapping files. The generated query-URL mapping files are designed to be set up according to the user(s) specification.

In another exemplary implementation, the user 102 desires to process the click-through log in the last week, the log data process component first retrieves the click-through log of the last week, then generates the query-URL mapping files for each day of the week (one file per day). Finally, the mapping files are stored in the user specified path.

Exemplary KES Algorithm

Figure 3:
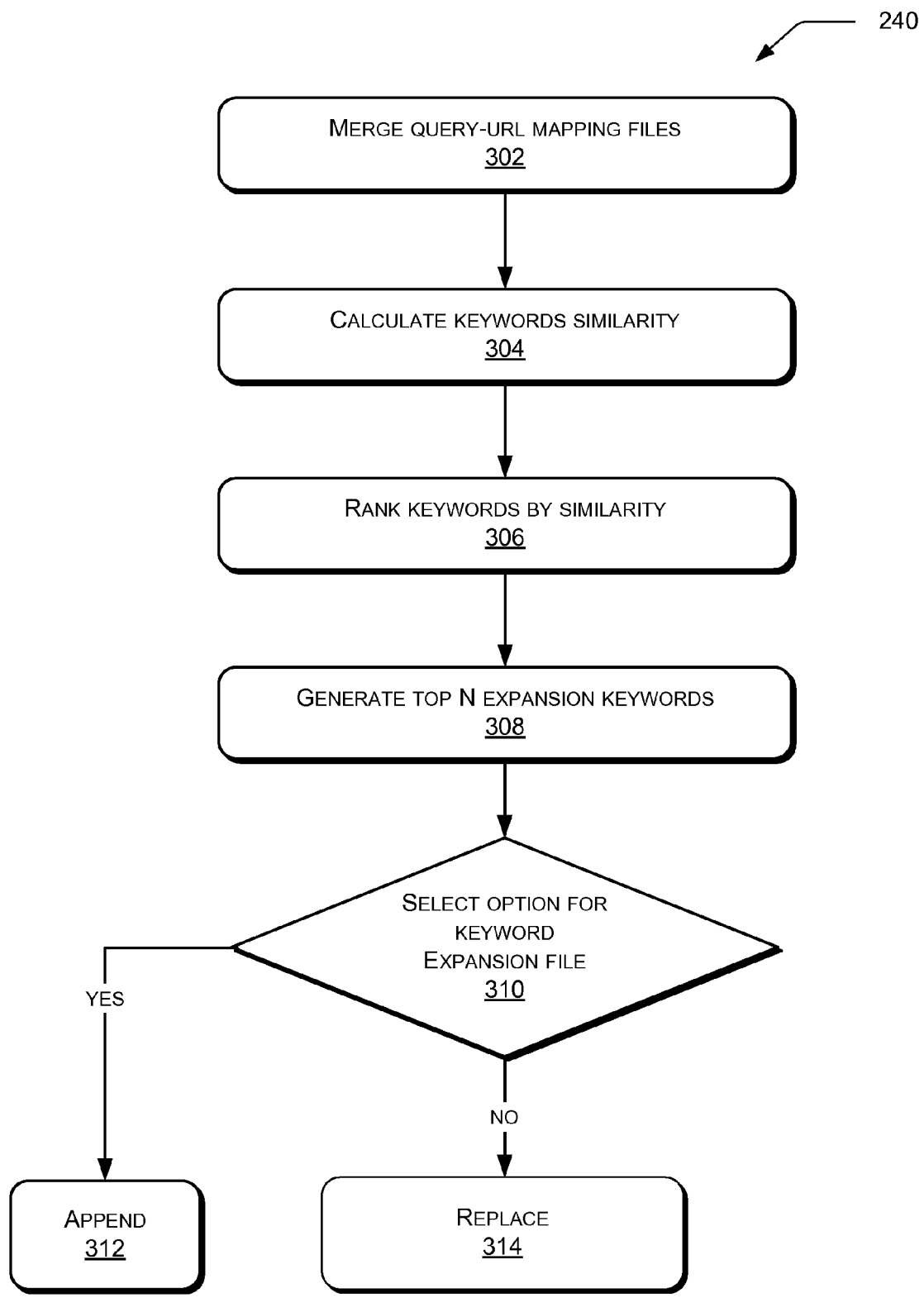
FIG. 3 is a flowchart showing an exemplary algorithm for the click-through log mining of FIG. 2.

FIG. 3 is a flowchart that illustrates the exemplary KES algorithm 240 for the click-through log mining for ads of FIG. 2 in detail. KES algorithm 240 expands an input keyword to include ad center bidding keywords or high frequency user queries, according to the query-URL correlations learned from query-URL mapping files.

Block 302 illustrates merging query-URL mapping files according to the specified time intervals. The time interval of the query-URL mapping files (KES_TIME_INTERVAL) for building KES algorithm is designed to be configurable. There are options for users to easily setup proper time interval based on: the latest day, the latest week, the latest month, and user specified time interval (such as MM/DD/YY-MM/DD/YY).

The query-URL mapping files generated in by the keyword log data process 202(b) Log Data Process step (denoted as MAP_STORE_PATH) is designed to be configurable to fit the scenario of the user 102. The generated expansion list store path (denoted as EXP_LIST_PATH) is designed to be configurable according to the real application scenario.

Block 304 illustrates calculating keywords similarity based on the correlated URL. The process receives information from a search click-through database to extract log data. As mentioned earlier, the click-through log data process 202 (a) extracts the log data and analyzes the log data. Thus, the flowchart illustrates processing raw search click-through log data to generate ordered query-uniform resource locator (URL) pairs. The keyword log data process 202(b) occurs at or about the same time as the click-through log data process. Here, the process 202(b) extracts keywords from a keyword log database and generates a keywords list.

Block 306 ranks keywords by similarity, wherein the algorithm 240 constructs a bipartite graph with one set of vertices corresponding to queries, and a second set of vertices corresponding to web pages. As mentioned previously, the similarity of queries and a similarity of web pages are mutually reinforcing notions; web pages are considered similar kinds, if the web pages are visited by similar type queries. Queries are grouped as similar types, if the queries visit similar web pages. Therefore, an iterative reinforcement as part of the algorithm 240, computes the similarity between the web pages and the queries, which fully explores the relationships between the web pages and the queries. This procedure executes iteratively until the algorithm 240 reaches a fixed point.

Block 308 illustrates generating the top N expansion keywords, which identifies the top number (N) most similar queries and is defined by the users. The algorithm 240 determines N from the similarity between the queries. The number of the expansion keywords (denoted as N) is configurable by users, according to an exemplary scenario. The number of expansion keywords that are output may range from 0 to the configured N.

In block 310, there is a determination of whether to selecting an option as to append this newly generated keywords expansion list to a previously deployed keywords expansion list or to replace the previous keywords expansion list. With the different setup of time intervals, users can choose to incrementally append a current KES expansion list with the latest time interval setup to the previous one, or simply replace the previous KES expansion list with the current one.

If the decision is to append the keyword expansion list, then the process proceeds to a YES branch. The YES branch then proceeds to block 312 indicating to append the keyword expansion list. The Append Mode 312 is where the current expansion list can be merged to the previous one to achieve a better overall coverage. Here, merged indicates a merging process with an operation to delete duplicated item between the new results and the existing information. In this mode, the expansion keywords, which were already covered in a previous list would update relevant scores of keywords, according to the current one. If appending the keyword expansion list, this creates a file that is larger and with more updated information.

Returning to block 310, if the decision is to replace the keyword expansion list, then the process flow proceeds to a NO branch. The NO branch then proceeds to block 314, indicating to replace the keyword expansion list. The Replace Mode is where the previous expansion list would be replaced by the current expansion list generated according to the latest time interval setup. However, if replacing the previous keywords expansion list, the older list is replaced and the new information is included in the newly generated list. This creates a file that has updated information.

Click-Through Log Mining System

Figure 4:
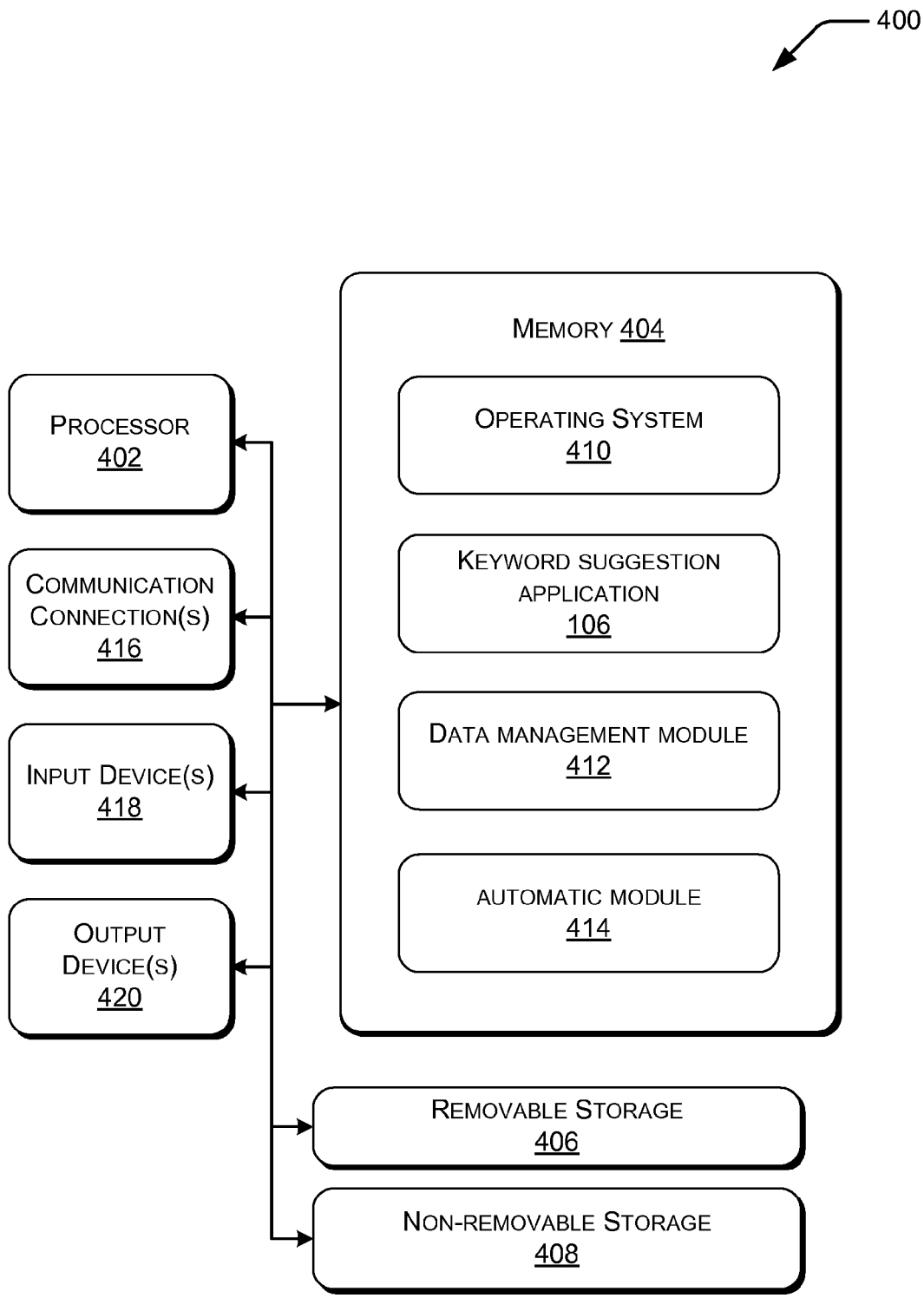
FIG. 4 is a block diagram showing an exemplary system for implementing the click-through log mining of FIG. 2.

FIG. 4 is a schematic block diagram of an exemplary general operating system 400. The system 400 may be configured as any suitable system capable of implementing click-through log mining for ads with keyword suggestion 106. In one exemplary configuration, the system comprises at least one processor 402 and memory 404. The processing unit 402 may be implemented as appropriate in hardware, software, firmware, or combinations thereof. Software or firmware implementations of the processing unit 402 may include computer- or machine-executable instructions written in any suitable programming language to perform the various functions described.

Memory 404 may store programs of instructions that are loadable and executable on the processor 402, as well as data generated during the execution of these programs. Depending on the configuration and type of computing device, memory 404 may be volatile (such as RAM) and/or non-volatile (such as ROM, flash memory, etc.). The system may also include additional removable storage 406 and/or non-removable storage 408 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 404 in more detail, may include an operating system 410, one or more click-through log mining for ads with keyword suggestion application programs 106 for implementing all or a part of click-through log mining ads and the keyword suggestion method. For example, the system 400 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 404 includes the click-through log mining for ads with keyword suggestion application program 106, a data management module 412, and an automatic module 414. The data management module 412 stores and manages storage of information, such as keywords, variety of phrases, and the like, and may communicate with one or more local and/or remote databases or services. The automatic module 414 allows the process to operate without human intervention.

Computer storage media includes volatile and nonvolatile, removable and non-removable media implemented in any method or technology for storage of information such as computer readable instructions, data structures, program modules or other data. Memory 404, removable storage 406, and non-removable storage 408 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 400 may also contain communications connection(s) 416 that allow processor 402 to communicate with servers, the user terminals, and/or other devices on a network. Communications connection(s) 416 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The system 400 may also include input device(s) 418 such as a keyboard, mouse, pen, voice input device, touch input device, etc., and output device(s) 420, such as a display, speakers, printer, etc. The system 400 may include a database hosted on the processor 402. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of click-through log mining for ads. For example, the methodological acts need not be performed in the order or combinations described herein, and may be performed in any combination of one or more acts.

The invention claimed is:

1. A method for providing keyword searches, implemented at least in part by a computing device, the method comprising:

processing raw search click-through log data based at least in part on set time intervals including a month, a day, and a year, to generate a click-through log;

generating ordered query keywords from the raw search click-through log data in which the ordered query keywords include query-uniform resource locator pairs;

constructing a bipartite graph based at least in part on the query-uniform resource locator pairs in which one set of vertices corresponds to queries and a second set of vertices corresponds to uniform resource locators;

based at least in part on the bipartite graph, utilizing an algorithm to compute
  (a) similarities between queries in which the similarities of the queries are based at least in part on visiting similar web pages associated with the uniform resource locators, and
  (b) similarities between the web pages associated with the uniform resource locators in which the similarities of the web pages are based at least in part on being visited by similar type queries to capture related phrases, wherein the algorithm comprises determining relationships between the queries and the web pages by iteratively computing similarities between the queries and the web pages;

identifying advertising keywords based at least in part on the similarities of the queries and the similarities of the web pages used to capture the related phrases by using a keyword expansion file associated with the set time intervals to expand the queries to include the advertising keywords according to a query-uniform resource locator (URL) correlation, the advertising keywords are based at least in part on a bidding criteria for advertisements; and suggesting the related phrases that have similar page-click behaviors based at least in part on the bidding criteria for the advertisements.

2. The method of claim 1, wherein the similarities between the queries and the web pages are iteratively computed until a fixed point is reached.

3. The method of claim 1, further comprising using the similarities between the queries to look up the advertisement keywords within the click-through log to get a top number (N) most similar queries.

4. The method of claim 1, wherein:
  the query-uniform resource locator (URL) correlation is learned from a query-URL mapping file; and
  the algorithm further calculates the ordered generated keywords based at least in part on a correlated URL.

5. The method of claim 1, wherein the algorithm further comprises ranking related ordered generated keywords with a relevance score.

6. The method of claim 1, wherein the bidding criteria further comprises at least one of a click-through rate or a revenue per search.

7. The method of claim 1, further comprising sorting the ordered query keywords according to a query alphabet.

8. The method of claim 1, further comprising filtering the query-uniform resource locator (URL) word pairs that are noisy.

9. The method of claim 1, further comprising selecting at least one option to amend the keyword expansion file or to replace the keyword expansion file with new keywords.

10. A computer-readable storage media comprising computer-readable instructions executed on a computing device, the computer-readable instructions comprising instructions for:

processing raw search click-through log data based at least in part on set time intervals including a month, a day, and a year, to generate a click-through log;

generating ordered query keywords from the raw search click-through log data in which the ordered query keywords include query-uniform resource locator pairs;

constructing a bipartite graph based at least in part on the query-uniform resource locator pairs in which one set of vertices corresponds to queries and a second set of vertices corresponds to uniform resource locators;

based at least in part on the bipartite graph, utilizing an algorithm to compute
  (a) similarities between queries in which the similarities of the queries are based at least in part on visiting similar web pages associated with the uniform resource locators, and
  (b) similarities between the web pages associated with the uniform resource locators in which the similarities of the web pages are based at least in part on being visited by similar type queries to capture related phrases, wherein the algorithm comprises determining relationships between the queries and the web pages by iteratively computing similarities between the queries and the web pages;

identifying advertising keywords based at least in part on the similarities of the queries and the similarities of the web pages used to capture the related phrases for a keyword expansion file associated with the set time intervals to expand the queries to include the advertising keywords according to a query-uniform resource locator (URL) correlation, the advertising keywords are based at least in part on a bidding criteria for advertisements; and suggesting the related phrases that have similar page-click behaviors based at least in part on the bidding criteria for the advertisements.

11. The computer-readable storage media of claim 10, wherein the similarities between the queries and the web pages are computed iteratively until a fixed point is reached.

12. The computer-readable storage media of claim 10, further comprising using the similarities between the queries to look up advertisement keywords within the click-through log to get a top number (N) most similar queries.

13. The computer-readable storage media of claim 10, wherein:
  the query-uniform resource locator (URL) correlation is learned from a query-URL mapping file; and
  the algorithm further calculates the ordered generated keywords based at least in part on a correlated URL.

14. A keyword suggestion system, comprising:
a processor;
a memory coupled to the processor, wherein the processor is configured for:
  processing raw search click-through log data based at least in part on set time intervals including a month, a day, and a year, to generate a click-through log, the ordered query keywords include keywords that are frequently submitted by users;
  generating ordered query keywords from the raw search click-through log data in which the ordered query keywords include query-uniform resource locator pairs;
  constructing a bipartite graph based at least in part on the query-uniform resource locator pairs in which one set of vertices corresponds to queries and a second set of vertices corresponds to uniform resource locators;

based at least in part on the bipartite graph, utilizing an algorithm to compute
(a) similarities between queries in which the similarities of the queries are based at least in part on visiting similar web pages associated with the uniform resource locators, and
(b) similarities between the web pages associated with the uniform resource locators in which the similarities of the web pages are based at least in part on being visited by similar type queries to capture related phrases, wherein the algorithm comprises determining relationships between the queries and the web pages by iteratively computing similarities between the queries and the web pages;

identifying advertising keywords based at least in part on the similarities of the queries and the similarities of the web pages used to capture the related phrases by using a keyword expansion file associated with the set time intervals to expand the queries to include the advertising keywords according to a query-uniform resource locator (URL) correlation, the advertising keywords are based at least in part on a bidding criteria for advertisements, wherein the bidding criteria comprises at least one of a click-through rate or a revenue per search; and suggesting the related phrases that have similar page-click behaviors based at least in part on the bidding criteria for the advertisements.

15. The system of claim 14, wherein the similarities between the queries and the web pages are computed iteratively until a fixed point is reached.

16. The system of claim 14, further comprising using the similarities between the queries to look up advertisement keywords within the click-through log to get a top number (N) most similar queries.

17. The system of claim 14, further comprising selecting at least one option to amend the keyword expansion file or to replace the keyword expansion file.

* * * * *